INVENTORS:
ALFRED RHEINER &
WALTER DIETERLE,

By: Stenderoth, Lind + Ponack

ATTORNEYS

Aug. 21, 1956  A. RHEINER ET AL  2,759,991
INSULATED ELECTRICAL CONDUCTORS
Filed Jan. 24, 1952
2 Sheets-Sheet 2

FIG. 4a

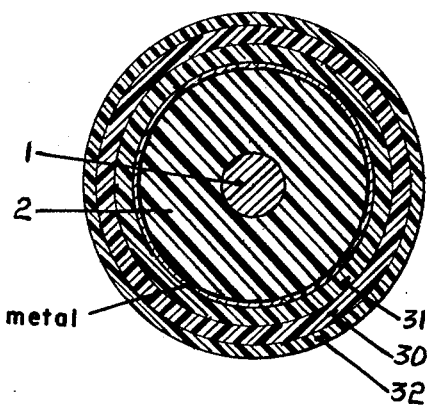

FIG. 5a

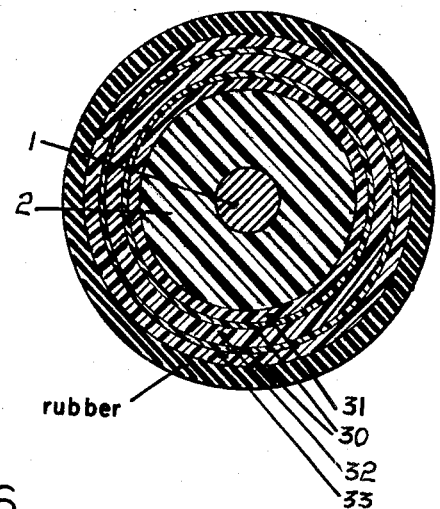

FIG. 6

TABLE OF LEGENDS

1— conductors
2— cellulose acetate fiber insulation
  21— Cotopa or Isocel string
  22— Isocel tape (of high porosity)
  23— Isocel tape covering the starquads
3— thermoplastic sheath consisting of:
  30— intermediate hygroscopic layer of cable paper
  31— inner thermoplastic sheath
  32— outer thermoplastic sheath 33— third and outer thermoplastic sheath INVENTORS:
ALFRED RHEINER &
WALTER DIETERLE,
BY *Theuseroth, Lind & Ponack*
ATTORNEYS

United States Patent Office 2,759,991
Patented Aug. 21, 1956

2,759,991

INSULATED ELECTRICAL CONDUCTORS

Alfred Rheiner and Walter Dieterle, Basel, Switzerland, assignors to Sandoz A. G., Basel, Switzerland, a Swiss firm Application January 24, 1952, Serial No. 267,956

Claims priority, application Switzerland January 26, 1951

3 Claims. (Cl. 174—120)

The present invention relates to insulated electrical constructions (cables and the like) comprising essentially a cable core consisting of one or more insulated conductors, and a covering of thermoplastic material.

It is a primary object of the present invention to embody insulated electrical conductors wherein, due inter alia to the character of the insulation employed, the structure is endowed with increased insulation life, improved power or dissipation factor, improved insulation resistance characteristics, greater heat resistance, enhanced moisture resistance, reduced dielectric losses particularly at higher frequencies, smaller capacity due to smaller dielectric constant, and a general improvement of the constancy of these electric characteristics on exposure to varying humidity influences relative to the corresponding characteristics of the conventional paper electrical insulation.

This and other objects and advantages are realized by the constructions according to the present disclosure. These constructions are especially suitable for weak-current (telephone) cables as well as for high voltage (intense current) cables and high frequency transmission cables (carrier cables).

It is a primary characteristic of the structures according to this invention that the insulation consists partly or wholly of cellulose acetate fibers. Where the insulation consists only partly of the said fibers, the remainder is constituted by air and/or a suitable impregnant of plastic or resinous material as hereinafter described. The term "cellulose acetate fibers" is intended to designate materials which are obtained according to any of the known processes by acetylating cellulose fibers such as cotton, paper and regenerated cellulose with the retention of the fiber structure. It is advantageous to use products with a degree of acetylation of 26 to 62% by weight of chemically combined acetic acid. See also, for example, Patent No. 2,357,962.

Improved electrical performance, with respect to the hereinbefore-enumerated electrical characteristics of the insulation, is obtained by modifying the porosity of the fibrous cellulose acetate insulation to increase the proportion of air space in the latter. To this end, use may advantageously be made of porous acetate paper, woven fibrous cellulose acetate and fibrous cellulose acetate. It is in this event, and in order to compensate for any loss in mechanical strength which may be bound up with this porosity, that the insulation may contain the plastic or resinous impregnant precedingly mentioned. Loss in mechanical strength characteristics, and especially in tensile strength, may be counterbalanced by impregnating the porous cellulose acetate material with a suitable plastic and/or resin, which maintains the desired porosity but strengthens the material. Particularly suitable impregnants or coating agents for such reinforcement are: cellulosic derivatives such as acetylcellulose, monomeric or low polymeric and polymerizable thermoplastic substances such as styrene, polystyrene and their polymerizable derivatives which may be catalytically polymerized in situ on the material of the insulation, thermoplastic polymers such as polyethylene, thermosetting resins in precondensed or condensed state such as melamine-aldehyde resins and the modified melamine-aldehyde resins, polyesters and silicones.

The amount of resin impregnant which is applied to the cellulose acetate fabric base is quite small (of the order of about one to ten percent by weight) and is therefore practically of no significance with regard to the electrical performance characteristics of the insulation according to the invention. On the other hand, in addition to improving the mechanical characteristics, the added impregnant may function to retard the absorption of moisture whereby the life of the cable may be still further increased.

The advantage of the cables, according to the present invention, compared with a cable whose insulation consists of ordinary paper, is that they show a considerably increased life and better electrical properties, and in comparison with a cable made with an artificial resin insulation, they possess better electrical properties and a greater resistance to heat. The last named property proves of particular advantage when the cable covering is sprayed on. By "electrical properties" are meant inter alia the resistance of the insulation, the power factor and the capacity of the insulation; and by "increased life" the increased stability of the insulation towards moisture. The last mentioned property is of special significance because coverings made from thermoplastic materials are permeable to moisture. The following example indicates the measure of the stability of fiber-cellulose acetates towards moisture in comparison with those of non-acetylated cellulose:

Cellulose acetate fibers which contain 35% by weight of combined acetic acid and which have been conditioned at an 80% relative humidity show an insulation resistance $10^3$ to $10^5$ times greater and a power factor 25 times smaller than the corresponding non-acetylated material conditioned at 80% relative humidity. Furthermore, it exhibits a dielectric constant which only amounts to 50 to 90% of that of the non-acetylated material.

The alteration of the electric data under the influence of diffusing humidity of a cable with thermoplastic cover insulated with cellulose acetate fibers is slowed down many times compared to a cable made with the usual paper insulation, and tends to a constant value so that a multiple of the life achieved so far (and recognized as insufficient) is obtained and thus also a useful cable.

Furthermore, a cable insulated in this manner distinguishes itself, as already mentioned, by better electrical properties, above all because of smaller leakance, smaller capacity and smaller dielectric losses.

The above mentioned behavior of the paper insulations used hitherto and of an insulation according to the present invention made from cellulose acetate fibers which contain 35% by weight of combined acetic acid towards the influence of diffusing moisture is demonstrated by measurements under various conditions.

The following electrical measurements were carried out with cable-simulating structures in the form of condensers which were tightly packed in suitable thermoplastic foils (polyethylene 0.05 mm.):

| Cable covering or its equivalent | | | Conditioning, Temperature, 0° C. and humidity | Time, Days | Insulation Resistance in MΩ | | Dielectric power factor tangens δ×10³ | | |
|---|---|---|---|---|---|---|---|---|---|
| Outer Layer | Intermediate Layer | Inner Layer | | | Ordinary cable paper | Acetylated cable paper[1] | Ordinary cable paper, 10³ Hz[2] | Acetylated cable paper,[1] 10³ Hz[2] | |
| (1) | | 1×PE 0.05 mm | 20° C. 80% relative humidity. | 0<br>1<br>4<br>20<br>100<br>200<br>230 | 10⁶<br>23,000<br>122<br>1.5<br>0.9<br>~0<br>310,000 | 10⁶<br>250,000<br>170,000<br>37,000<br>12,000<br>10,000<br>10⁶ | 4.0<br>9.3<br>67.0<br>465.0<br>>550<br>>550<br>6.0 | 2.9<br>4.4<br>7.5<br>11.2<br>13.6<br>13.6<br>4.6 | Plate Condenser.<br><br><br><br>After drying 24 hours at 60° C. 48 hours over P₂O₅. |
| (2) | | 1×PE 0.05 mm | 20° C. in water | 0<br>1<br>4<br>10<br>20<br>100<br>200<br>230 | 10⁶<br>1,000<br>4.3<br>0.3<br>~0<br>~0<br>~0<br>800,000 | 10⁶<br>10⁶<br>500,000<br>200,000<br>3,000<br>20<br>20<br>10⁵ | 3.65<br>11.6<br>27.0<br>260<br>>550<br>>550<br>>550<br>6.4 | 4.0<br>4.0<br>5.0<br>5.0<br>7.0<br>35.0<br>60<br>4.5 | Plate Condenser.<br><br><br><br>After drying 24 hours at 60° C. 48 hours over P₂O₅. |

10⁶ MΩ denotes: highest insulation resistance measurable with the apparatus at hand, i. e. ≥10⁶ MΩ.
Plate condenser: 100 mm. φ, approx. 1 mm. thickness of the dielectric.
PE: Polyethylene.
[1] According to the present invention.
[2] Hz=cycles per second.
The measurements were made according to ASTM especially for insulation resistance: ASTM D 257–46 and for power factor and dielectric constant: ASTM D 150–47 T. [App.: Bridge General Radio 716–C.].

A further improvement to attain a moisture-resistant, longer-lived insulation (and cable) of constant electrical properties is achieved by providing the cellulose acetate fibrous insulation (resin-impregnated or not) about the conductor with a laminated covering comprising an intermediate hygroscopic layer interposed between two thermoplastic or thermosetting moisture-resistant resinous layers. The intermediate hygroscopic layer—regenerated cellulose, paper, cotton or the like—operates to trap inwardly diffusing moisture and thereby prevents its penetration to the insulation surrounding the conductor at the core of the cable.

A repeated structural series of such intermediate layer assemblies—i. e. where each assembly is constituted by an intermediate layer, chosen to be as hygroscopic as possible, is inserted each time between two thermoplastic layers—makes it possible to realize a further considerable reduction of the diffusion of moisture towards the cable core, and the life of such a cable is thus still further prolonged. Normally two or three such assemblies will suffice. In certain applications a greater number may be desired, and no upper limit is placed on the number of such assemblies except as considerations of practicality are involved.

The behavior described, especially the inhibiting influence of the intermediate layer towards diffusion, is demonstrated by the following results of electrical measurements on cable-simulating structures in the form of condensers (insulation each time of ordinary cable paper and of acetylated cable paper containing 35% by weight of combined acetic acid, which were tightly wrapped in two polyethylene foils of 0.05 mm. thickness each, in one case with an intermediate layer of cotton or paper):

| Cable covering or its equivalent | | | Conditioning, Temperature, 0° C. and humidity | Time, Days | Insulation Resistance in MΩ | | Dielectric power factor tangens δ×10³ | | | | |
|---|---|---|---|---|---|---|---|---|---|---|---|
| Outer Layer | Intermediate Layer | Inner Layer | | | Ordinary cable paper | Acetylated cable paper[1] | Ordinary cable paper | | Acetylated cable paper[1] | | |
| | | | | | | | 10³Hz[2] | 10⁵Hz[2] | 10³Hz[2] | 10⁵Hz[2] | |
| (3) | 1×PE 0.05 mm. | | 1×PE 0.05 mm. | 60° C. Over water | 0<br>5<br>6<br>11<br>19<br>25 | 10⁶<br>1,850<br>0.8<br>~0<br>~0<br>~0 | 10⁶<br>10⁶<br>6,400<br>4<br>2.5<br>0.5 | 4.4<br>46.0<br>>550<br>>550<br>>550<br>>550 | 4.65<br>12.0<br>156<br>>550<br>>550<br>>550 | 1.55<br>2.9<br>15.0<br>21.3<br>215.0<br>400 | 5.0<br>5.0<br>7.1<br>19.5<br>28.5<br>90 | Plate Condenser. |
| (4) | 1×PE 0.05 mm. | 1×cotton, approx. 40 g/m.² | 1×PE 0.05 mm. | 60° C. over water | 0<br>5<br>6<br>11<br>19<br>25 | 10⁶<br>16,000<br>4<br>0.05<br>~0<br>~0 | 10⁶<br>10⁶<br>40,000<br>196<br>42<br>42 | 3.4<br>18.7<br>550<br>>550<br>>550<br>>550 | 5.3<br>8.7<br>66.0<br>255.0<br>>550<br>>550 | 1.65<br>2.3<br>8.7<br>36.0<br>70.5<br>58.0 | 4.3<br>7.2<br>6.4<br>11.0<br>15.0<br>13.0 | Plate Condenser. |

10⁶ MΩ denotes: highest insulation resistance measurable with the apparatus at hand, i. e. ≥10⁶ MΩ.
Plate condenser: 100 mm. φ, approx. 1 mm. thickness of the dielectric.
PE: Polyethylene.
[1] According to the present invention.
[2] Hz=cycles per second.
The measurements were made according to ASTM especially for insulation resistance: ASTM D 257–46 and for power factor and dielectric constant: ASTM D 150–47 T. [App.: Bridge General Radio 716–C.]

The accompanying drawings illustrate representative constructional embodiments in accordance with the invention.

Fig. 1a, and each of Figs. 1b, 1c and 1d is a cross section through an insulated structure according to the invention;

Figs. 2a, 3a, 4a and 5a are cross-sectional showings of further embodiments of conductors, cables or the like according to the invention.

Fig. 6 is a table of explanatary legends.

Figure 1A:
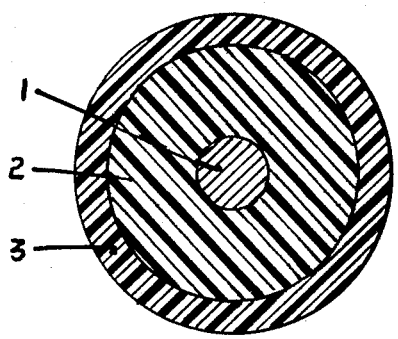
Fig. 1a shows the fundamental relationship of parts according to the invention, 1 designating the conductor(s), 2 designating the cellulose acetate fiber insulation(s) therearound, and 3 designating the covering (shown here as a single thermoplastic layer).

This same relationship of parts (designated by reference characters 1, 2 and 3) occurs in all the subsequent figures of drawing.

Figure 2A:
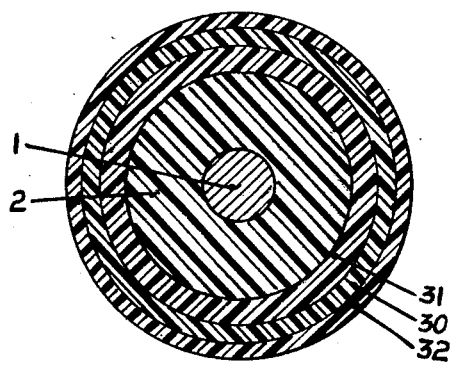

Fig. 2a shows a laminated assembly 3 around the same cable core as that of Fig. 1a, said assembly consisting as hereinbefore described of a hygroscopic element 30 interposed between thermoplastic layers 31 and 32.

Figure 3A:
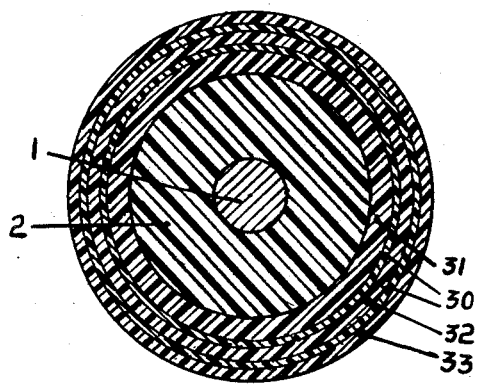

The structure according to Fig. 3a incorporates that according to Fig. 2a but additionally includes a third, outer thermoplastic layer 33.

The intermediate layer or layers 30 of hygroscopic material is selected so as to have as high a hygroscopicity as practical and to be of high density (which may be achieved by calendering). A well-suited material for this purpose, whose application in a similar sense (wrapping in the form of tapes or strips) is already known in the manufacturing of cables, is for example ordinary insulation paper which has however been as highly compressed as possible and which may, under certain circumstances, receive special treatment, for instance impregnation with a hygroscopic material such as silica gel, in order to increase its hygroscopicity. In the place of paper, compressed and/or treated fabrics, e. g. cotton tapes, may be used with equal advantage.

In the construction according to Fig. 4a, which otherwise is identical with that of Fig. 2a, a metallic layer is inserted between the insulated core and the laminated covering. The metal, advantageously in foil form, may be of lead, aluminum, ferrous metal or the like. The metal insert may, if desired, occur within the laminated assembly.

Fig. 5a illustrates an embodiment wherein the interior of the cable may correspond to any one of the embodiments of Figs. 1a to 4a, together with an exterior covering of material, such as rubber or the like, which is conventionally employed in cable structures. The outermost cover may however consist of any thermoplastic material of the required mechanical qualities—(primary emphasis being laid upon good resistance to abrasion and rubbing), and the inner coverings may take over the functions of protecting against moisture.

Thermoplastic resinous layers are preferred as the laminae between which the intermediate hygroscopic layer or layers are inserted, because the manufacture of the cable constructions is thereby readily adapted to conventional laminating operations and or to the use of a heated die under pressure, care being taken to maintain the water-retaining properties of the said intermediate layers.

Figure 1B:
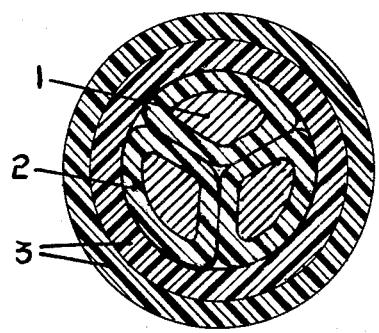

Fig. 1b discloses a construction according to the invention wherein the core comprises a plurality of electrical conductors 1, three being shown in the illustrated embodiment. Each conductor is covered by a covering of cellulose acetate fiber insulation according to the invention, and the three conductors are arranged as shown to constitute a core of essentially circular cross section. This core is then sheathed in an outer thermoplastic sheath constituted by two layers 3.

Figure 1C:
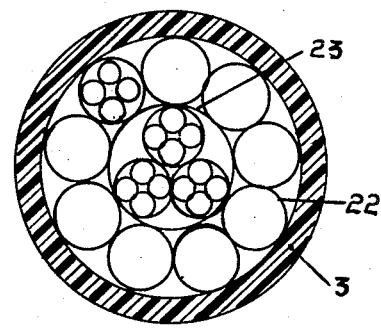

Fig. 1c shows the starquad type of construction for the core of the cable, the starquads being encompassed by Isocel tape coverings 22, 23. The thus-constructed core is then sheathed in an outer sheathing 3 of thermoplastic material.

Figure 1D:
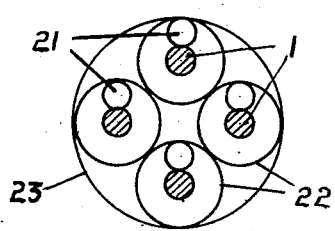

Fig. 1d is an enlarged detail of one of the starquads of Fig. 1c, and shows the conductors 1 associated with Cotopa or Isocel string 21, each group being wound with Isocel tape 22 of high porosity and the whole being enclosed in Isocel tape 23.

*Example 1*

In the following the construction of a telephone cable with 500 pairs of usual assembly of the pairs forming a core of approx. 60 mm. diameter may be described.

*Core of the cable.*—The insulation of the conductors is of the well known air space paper cable type; however the strings wound round the bare copper wires consist of acetylated cellulose fibers in paper form containing 35% by weight of combined acetic acid.

A spirally wound covering also consisting of acetylated cellulosic fibers in paper form is then placed around each single conductor with its air space string. This covering is applied in tapes and overlapping spirals.

The twisting and stranding of the pairs, quads and bundles is done as usual but for replacing the conventional insulating material by acetylated cellulosic fibres in paper form for taping the pairs, quads and bundles.

For terminating a tape of acetylated cotton with 30% combined acetic acid is tightly wound in overlapping spirals around the core.

*Sheath of the core.*—The core insulated as aforedescribed is taped with spirally wound and overlapping aluminium foil. Upon this aluminium foil layer a seamless tubular sheath of polyethylene is extruded. The cable so protected may be further provided with stuffing, armouring and bituminous serving.

*Example 2*

Description of a special cable for carrier telephony of the star quad type with 24 pairs or 12 spiral four quads with copper conductor of 1,3 mm. diameter. The assembly can be done according to the designs and methods applied so far for paper-type cables.

*Core of the cable.*—The insulation of the conductors is of the air space type, the strings wound spirally around the bare copper conductors consisting of acetylated cotton containing 62% by weight of combined acetic acid.

On these conductors served with these air space strings, a spirally wound "paper" tape of high porosity (density: 0.2–0.3 grammes per cm.$^3$), consisting of acetylated cellulosic fibers with 35% combined acetic acid is applied. This highly porous acetylated paper-tape has previously been impregnated with 4–6% of its weight of cellulose triacetate for improving its mechanical properties. For the taping of the star quads and the star quad layers acetylated cellulosic fibers in paper form are used.

Round the whole core a lapping of acetylated cotton with 30% combined acetic acid is applied.

*Sheathing.*—Right on the acetylated cotton lapping a seamless tubular sheath of polyethylene tetrasulfide (trade name: Thiokol) is applied by extrusion. Then follows a layer of spirally wound tape of highly calendered ordinary cable insulating paper. At last a second seamless tubular sheath consisting of a specially blended polyvinyl-chloride (as sold under the trade names: Igelite or Protodur H) is extruded and pressed round the cable.

If desired the cable so protected may be provided with stuffing, armouring and bituminous serving.

*Example 3*

In the third example the invention is embodied in a high voltage power cable of the three conductor mass-cable type.

*Core of the cable.*—Each of the three copper or aluminium conductors of circular or any other section receives an insulation of acetylated cellulosic fibers in paper form containing 35% by weight of combined acetic acid, which is then impregnated with a suitable insulating agent (oil or mass).

Each insulated conductor is then taped with acetylated cellulosic fibers in paper form containing 35% by weight of combined acetic acid and on which a thin metallic layer has been applied by one of the well known processes for metallising paper, the tape being wound in overlapping spirals.

The gaps and interstices between the three conductors insulated as above are stuffed with paper to form a core of circular section on which a tape of metallic wires braided with cotton yarn is applied to form a screen or shield.

Because of the much lower moisture contents and the much greater absorbency of acetylated paper as compared with conventional cable-paper a material saving in time can be achieved in the drying and impregnation operations.

*Sheathing.*—On the screened core a layer of polymer acrylates (as for instance found in the trade under the name of Stabol) is applied. This first layer, besides protecting the core against moisture also grants some mechanical strength and prevents leakage of the impregnating agent.

A spirally wound copper foil tape is then placed around the first sheath. Then follows a second covering of polyethylene applied by extrusion in form of a seamless tubular sheath.

In this second sheath an intermediate layer of calendered cable insulating paper is taped and the whole covered with a seamless sheath applied by extrusion of a specially blended poly-vinyl-chloride (as e. g. Igelite or Protodur H).

The three conductor-cable so protected can be further provided if required with a stuffing layer, a steel tape armouring and a serving of bituminous jute tape.

Having thus disclosed the invention, what is claimed is:

1. An insulated cable, particularly suitable for use as a weak-current cable, a high voltage cable and a high frequency transmission cable, said cable comprising a cable core consisting of at least one insulated conductor wherein the insulation comprises acetylated cellulose fibers, the structure of which has been maintained during the acetylation thereof, a multi-layered covering of thermoplastic material for said core, and at least one layer of hygroscopic material disposed between two layers of said thermoplastic covering.

2. An insulated cable, particularly suitable for use as a weak-current cable, a high voltage cable and a high frequency transmission cable, said cable comprising a cable core consisting of at least one insulated conductor wherein the insulation comprises acetylated cellulose fibers, the structure of which has been maintained during the acetylation thereof, a multi-layered covering of thermoplastic material for said core, at least one metallic layer disposed between said insulated core and said thermoplastic covering, and at least one layer of hygroscopic material disposed between two layers of said thermoplastic covering.

3. An insulated cable according to claim 2, wherein the said metallic layer is in the form of a metal foil.

References Cited in the file of this patent
UNITED STATES PATENTS

| | | |
|---|---|---|
| 2,029,481 | Haskins | Feb. 5, 1936 |
| 2,056,085 | Alles | Sept. 29, 1936 |
| 2,092,477 | Scott et al. | Sept. 7, 1937 |
| 2,133,301 | Martin | Oct. 18, 1938 |
| 2,216,435 | Eckel | Oct. 1, 1940 |
| 2,446,292 | McConnell et al. | Aug. 3, 1948 |
| 2,577,077 | Forsberg | Dec. 4, 1951 |